Patented July 31, 1951

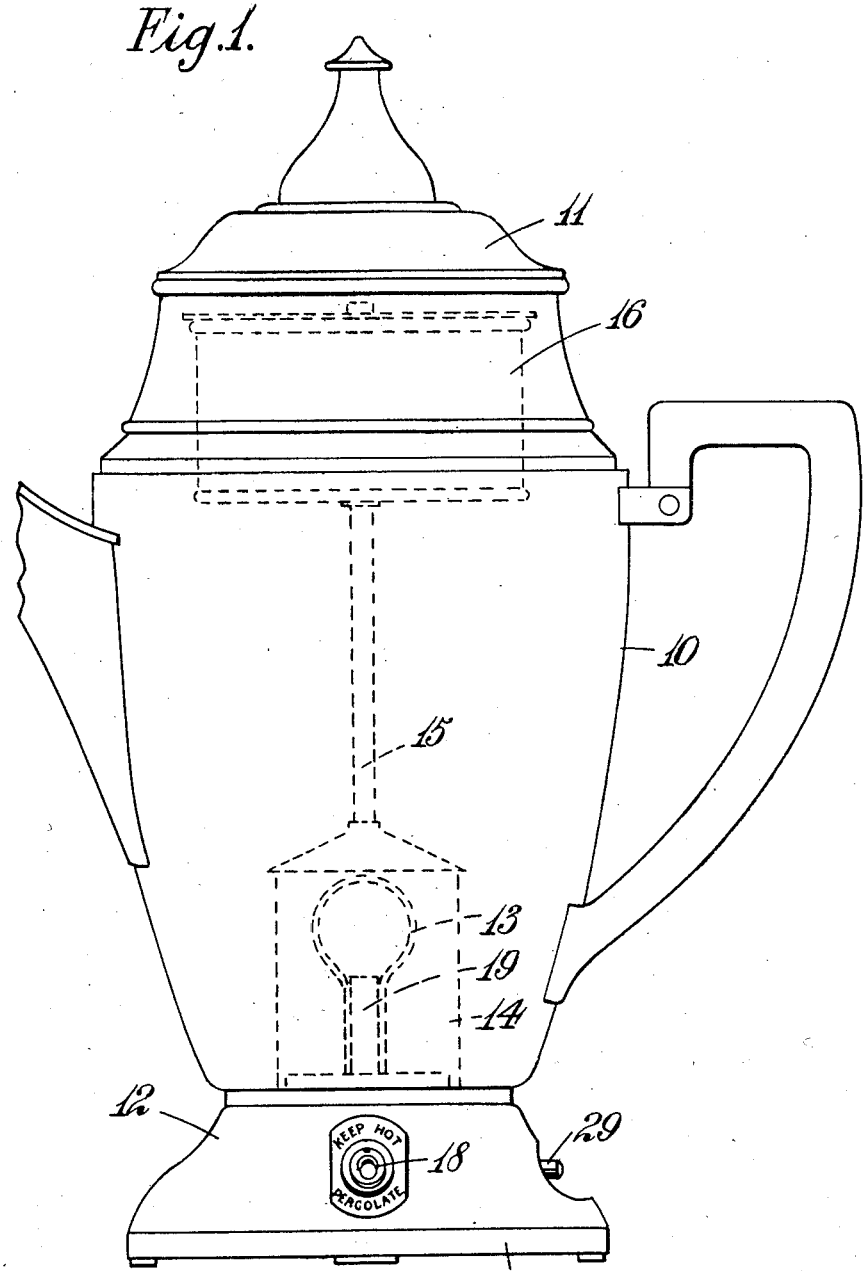

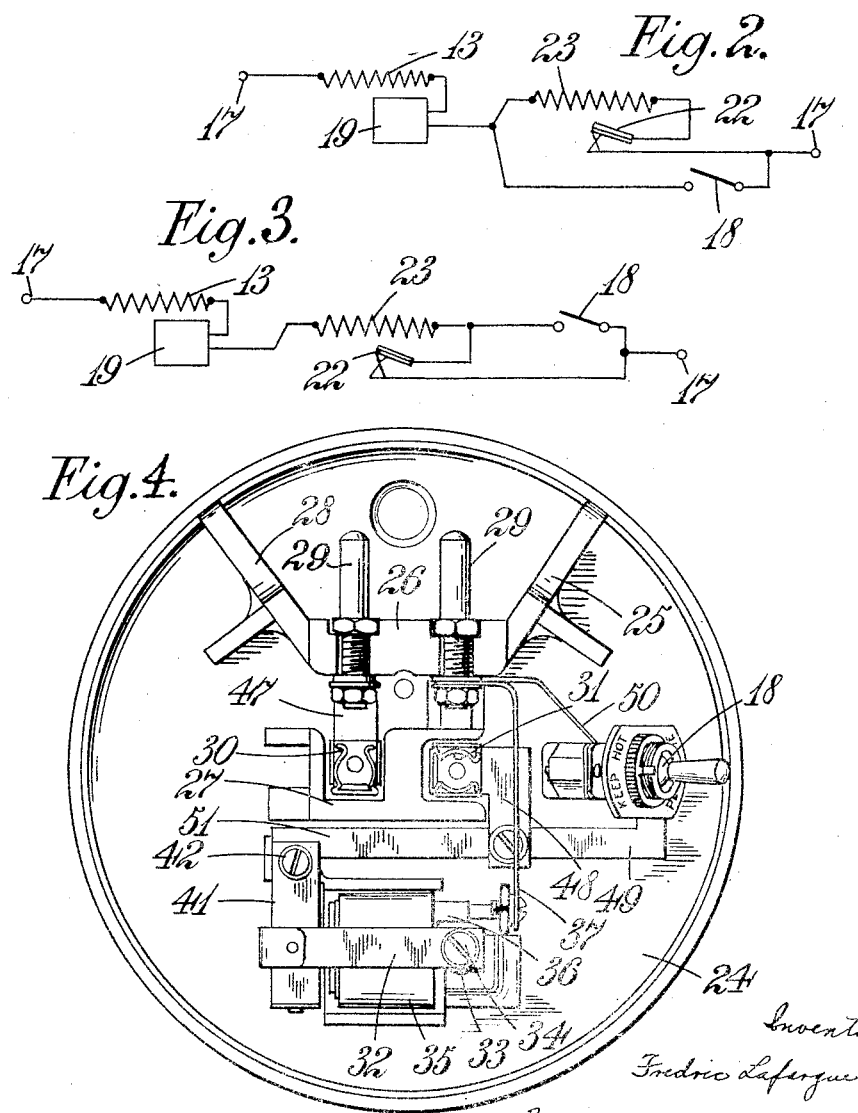

2,562,763

UNITED STATES PATENT OFFICE 2,562,763

COFFEE PERCOLATOR AND LIKE LIQUID HEATING DEVICES

Fredric Lafargue Best, Felixstowe, England, assignor to Best Products Limited, Suffolk, England, a British company Application May 2, 1949, Serial No. 90,891
In Great Britain June 14, 1948

3 Claims. (Cl. 219—44)

This invention relates to coffee-percolators and like electric domestic liquid-heating appliances. In such liquid heating devices it is desirable to be able to boil the liquid rapidly and subsequently to reduce the supply of heat to an extent which will be sufficient to maintain the liquid at a temperature somewhat below its boiling point, without boiling it.

An object of the invention is to provide an improved construction and arrangement whereby the foregoing result is achieved.

In the accompanying drawings,

Figure 1 is a diagrammatic view in elevation of a coffee-percolator embodying the present invention, Figures 2 and 3 are circuit diagrams of alternative methods of controlling the heat-supply, and Figure 4 is a partial plan view showing a constructional embodiment of one form of this invention.

Referring first to Figure 1, a coffee-percolator comprises a main liquid-container 10 with a lid 11 and a base 12 whereon the container is secured. An electric immersion heating element 13 is mounted in the container 10 near the bottom thereof, within a chamber 14 from which a tube 15 extends upwards to the receptacle 16 for the coffee, the general arrangement being that when the element 13 is energised, the water in the chamber 14 is vigorously heated and circulates upwards by the tube 15 to percolate through the coffee at the top 16. The circulation is maintained by water entering the chamber 14 through suitable openings near the bottom.

An electric supply is given to the device by the usual pair of contact pins 29, which are mounted on the base 12, and a switch 18 of any convenient form is also mounted on the base and is movable into two positions which are marked respectively "Keep hot" and "Percolate," corresponding to the low and high rates of heat-supply respectively.

Figures 2 and 3 show alternative circuit diagrams of the arrangement for adjusting the rate of supply of heat to the liquid; in Figure 2 the immersion heater 13 is connected at one end to one of the supply lines 17 and the other end is connected through the safety switch 19 and a thermally operated switch 22 with the other supply line 17. The switch 22 is a bi-metallic switch which is closed when it is cold but is provided with a heating element 23 in series with it which when heated by current passing through it causes the switch to open. The manually operated switch 18 is connected in parallel with the switch 22 and heating element 23 so as to short circuit them when closed. When the switch 18 is closed, the current supplied through the immersion element 18 is such as will rapidly bring the liquid up to its boiling point.

After the liquid has boiled and it is desired merely to keep it hot, the switch 18 is opened so that the current passes through through the bi-metallic switch 22 and its heating element 23, and this switch thereupon operates automatically, intermittently to interrupt the circuit of the immersion element 13. The periods of interruption are such that the average rate of heat-supply maintains the liquid in the neighbourhood of the desired temperature, and it is to be observed that the operation of the switch 22 is not dependent on the temperature of the liquid, but is determined only by its own characteristics and adjustment.

An advantage of this construction is that the heating element 23 can be arranged in such close proximity to the bi-metallic strip 22 that the watt-loss expended in the operation of the switch is negligible.

As shown in Figure 4, the base of the percolator comprises a plate 24 of a suitable electrical and thermal insulating material with upstanding walls at 25, 26, 27 and 28 to provide a partial enclosure for exposed electrical connections. These comprise a pair of contact-pins 29 to receive a socket on the external connector, these pins 29 being indicated at 17 in Figure 1. There is also provided a pair of spring-sockets 30, 31 which are open upwardly to receive a pair of co-operating pins secured on the bottom of the liquid-containing vessel 10 and which are the terminals of the immersion heating element 13 in that vessel.

The thermally-operated switch comprises a bi-metallic strip 32 anchored at its end 33 by a screw 34 so as to be in electrical contact with the metal casing 35 of a heating element 36. One end of the heating element is connected to the conducting strip 37 and the other end is connected to the casing 35 so that a circuit is provided through the heating element from the strip 37 to the bi-metallic strip 32. The free end of this strip engages the contact-member 41 which in turn is connected to both the switch 18 and the spring-socket 31, so that the circuit is represented diagrammatically in Figure 4.

The main heating element 13 (see Figure 1) is of the immersion-type and it is therefore desirable to provide a thermally-operated safety-switch 19; this is preferably of the kind described in my concurrent patent application No. 89,498 now Patent Number 2,523,954 and is mounted in contact with the immersion heating element 13 to safeguard that element against damage or destruction by over-heating in the event of current being switched on when there is no liquid in the vessel or if the liquid level is too low.

Figure 3 shows a slight modification of the circuit arrangement of Figure 2 in which the manually-operable switch 18 is connected so as to short-circuit only the bi-metallic switch 22, and the auxiliary heating resistance 23 for the bi-metallic switch is permanently connected in series with the main immersion element 13 and the safety-switch 19. The advantage of this arrangement is that the bi-metallic switch 22 is operated even when it is short-circuited so that after percolation is complete, and the switch 18 is opened, the reduced average rate of heating is immediately brought into operation without waiting until the element 23 heats up the switch 22.

It will be seen that in the arrangements according to both Figure 2 and Figure 3, operation of the switch 22 is not dependent on the temperature of the liquid.

I claim:

1. A coffee-percolator comprising in combination a liquid-containing vessel, an electric immersion heater therein, a thermally-operated safety switch mounted on said heater and in series therewith to open the circuit thereof on an undue rise of its temperature, a bi-metallic strip, an electric heating element adjacent thereto, electrical contacts movable by said strip to separate when it is heated, said contacts and said heating element being connected in series with said immersion heater, and a manually-operable switch connected in parallel with said electrical contacts.

2. A coffee-percolator as set forth in claim 1, wherein the manually-operable switch is arranged to short-circuit said electrical contacts and the heating element appropriated to them.

3. A coffee-percolator comprising in combination a liquid-containing vessel, an electric immersion heater therein, a thermal safety-switch on said heater and in series therewith, a base supporting said vessel, spring-sockets mounted on said base engageable with said immersion heater, contact-pins on said base engageable with electric supply mains, an electrical connection from one of said pins to one of said sockets, a manually operable two-position switch connected in circuit between the second of said pins and the second of said sockets, an auxiliary heating element, and a bimetallic switch in proximity thereto and in series therewith also connected between the second of said pins and the second of said sockets.

FREDRIC LAFARGUE BEST.

REFERENCES CITED

The following references are of record in the file of this patent:

UNITED STATES PATENTS

| Number | Name | Date |
| --- | --- | --- |
| 987,293 | Gale | Mar. 21, 1911 |
| 1,954,147 | Shroyer | Apr. 10, 1934 |
| 2,029,596 | Smith | Feb. 4, 1936 |
| 2,076,096 | Samuels et al. | Apr. 6, 1937 |
| 2,274,607 | Cohen | Feb. 24, 1942 |
| 2,430,194 | Snyder | Nov. 4, 1947 |